(12) United States Patent
Leger

(10) Patent No.: US 6,910,878 B2
(45) Date of Patent: Jun. 28, 2005

(54) OXY-FUEL FIRED PROCESS HEATERS

(75) Inventor: Christopher Brian Leger, Houston, TX (US)

(73) Assignee: Praxair Technology, Inc., Danbury, CT (US)

( * ) Notice: Subject to any disclaimer, the term of this patent is extended or adjusted under 35 U.S.C. 154(b) by 64 days.

(21) Appl. No.: 10/464,541

(22) Filed: Jun. 19, 2003

(65) Prior Publication Data

US 2004/0259045 A1 Dec. 23, 2004

(51) Int. Cl.[7] .................................................. F23J 7/00
(52) U.S. Cl. .......................... 431/4; 431/10; 431/351; 431/187
(58) Field of Search .............................. 431/4, 10, 350, 431/351, 187; 432/218, 219, 223, 225; 239/424, 424.5

(56) References Cited

U.S. PATENT DOCUMENTS

| | | | |
|---|---|---|---|
| 3,245,395 A | * | 4/1966 | Golibrzuch et al. ........ 126/109 |
| 4,166,434 A | | 9/1979 | Jensen et al. |
| 4,194,966 A | | 3/1980 | Edison et al. |
| 4,324,649 A | | 4/1982 | Parizot et al. |
| 4,378,205 A | | 3/1983 | Anderson |
| 4,412,975 A | | 11/1983 | Parizot et al. |
| 4,541,796 A | * | 9/1985 | Anderson ................... 431/187 |
| 4,863,371 A | | 9/1989 | Ho |
| 4,878,829 A | | 11/1989 | Anderson |
| 4,907,961 A | | 3/1990 | Anderson |
| 4,946,382 A | | 8/1990 | Kobayashi et al. |
| 4,969,814 A | | 11/1990 | Ho et al. |
| 4,988,285 A | | 1/1991 | Delano |
| 5,065,736 A | * | 11/1991 | Mutchler ................ 126/110 B |
| 5,104,310 A | | 4/1992 | Saltin |
| 5,242,296 A | | 9/1993 | Tuson et al. |
| 5,975,886 A | * | 11/1999 | Philippe ..................... 431/165 |
| 6,044,837 A | * | 4/2000 | Tyler ........................ 126/99 C |
| 6,264,798 B1 | | 7/2001 | Gibson et al. |

OTHER PUBLICATIONS

"Fired Heaters for General Refinery Service", API Standard 560, Third Edition, May 2001, American Petroleum Institute.

"Burners for Fired Heaters in General Refinery Services", API Publication 535, First Edition, Jul. 1995, American Petroleum Institute.

* cited by examiner

Primary Examiner—Alfred Basichas
(74) Attorney, Agent, or Firm—Donald T. Black

(57) ABSTRACT

Process heaters operated with a burner that uses high-oxygen oxidant gas instead of air and that recirculates and entrains combustion gases, wherein oxidant gas is injected at an angle to the fuel nozzle.

20 Claims, 2 Drawing Sheets

OXY-FUEL FIRED PROCESS HEATERS

FIELD OF THE INVENTION

The present invention relates to apparatus and methods useful to heat fluid, such as process fluids encountered in the chemical and petroleum processing industries.

BACKGROUND OF THE INVENTION

In many process industries direct fired heaters are commonly used to heat gaseous and liquid fluids, such as distillation column feeds and reactor feeds. The direct fired heater generally includes an enclosed structure and a conduit through which the process fluid enters the structure, passes within the structure, and exits the structure. Necessary heat is obtained from the combustion of liquid or gaseous fuel using air-fired burners that fire into the structure Heat of combustion passes to the process fluid through the walls of the conduit, which often takes a coiled or otherwise elongated path within the structure so as to increase the opportunity for this heat transfer.

The combustion reactions, however also form NOx (by which is meant oxides of nitrogen such as but not limited to NO, $NO_2$, $NO_3$, $N_2O$, $N_2O_3$, $N_2O_4$, $N_3O_4$, and mixtures thereof). As NOx is an environmental pollutant, it would be very desirable to lessen the amount of NOx that is generated in the operation of process heaters. However, attempts to reduce the formation of NOx are frustrated by the other constraints present in process heater operation, such as the heat uptake limitations imposed by the metallurgical properties of the material from which the conduit is formed, the tendency of the process fluid to experience coking, and the ability to maintain negative draft in the heater that is adequate to carry combustion air into the heater. These frustrations are compounded by the generally accepted understanding that combustion of fuel with oxygen alone, or with oxidant having an oxygen content elevated over that of air, is expected to increase the temperature of the flame and therefore increase the amount of NOx that is formed.

Operation of air-fired process heaters also presents challenges of obtaining satisfactory heat transfer to the process fluid without exceeding the maximum temperatures that can be tolerated to avoid coking of the process fluid and metallurgical damage to the conduit. It has generally been understood that within the radiant section of the process heater there is a heat flux gradient along the length of the burner flames. The gradient is substantial enough that remaining below the maximum tolerable temperature at peak heat flux locations forces acceptance of a less than maximum overall average heat flux to the process fluid. This in turn imposes constraints on the throughput that can be attained, on the maximum absorbed duty, or on the maximum outlet temperature of the process fluid.

The present invention achieves the objective of lessened NOx formation, while achieving greater uptake of the generated heat and providing other advantages described herein.

BRIEF SUMMARY OF THE INVENTION

One aspect of the present invention is a method of heating a fluid, comprising:

(A) providing a heater comprising:
   (i) a chamber having an outlet for combustion gases produced in said chamber,
   (ii) at least one fuel nozzle for feeding fuel into said chamber, and proximal nozzle means for feeding oxidant gas proximal to said at least one fuel nozzle to stabilize the flame formed by combustion of the fuel as it emerges from said at least one fuel nozzle,
   (iii) means for feeding fuel to said at least one fuel nozzle,
   (iv) means for feeding oxidant gas to said proximal nozzle means, and
   (v) a conduit at least a portion of which is located within a region of said chamber so that its outer surface is heated by radiation of heat generated by combustion of said fuel within said chamber, said conduit having an inlet end outside said chamber for receiving fluid and an outlet end outside said chamber for discharging fluid outside said chamber, (B) feeding fuel through said at least one fuel nozzle into said chamber and feeding oxidant gas through said proximal nozzle means so as to stabilize the flame formed by combustion of the fuel as it emerges from said at least one fuel nozzle, while feeding oxidant gas into said chamber from a source thereof through a plurality of oxidant gas nozzles spaced further than said proximal nozzle means from said at least one fuel nozzle, and (C) combusting said fuel in said chamber with the oxidant gas fed through said proximal nozzle means and said oxidant gas nozzles, wherein the orientation of the axis of each oxidant gas nozzle with respect to the axis of the at least one fuel nozzle, the aggregate cross-sectional area of said oxidant gas nozzles, and the velocity of the oxidant gas fed through said oxidant gas nozzles, are effective to promote circulation within said chamber of combustion gases produced by combustion of said fuel with said oxidant gas and to provide that the ratio of the peak heat flux to the average heat flux to said conduit in said region during said combustion is lower than said ratio when the same fuel is combusted to obtain the same absorbed duty in the heater provided in step (A) but using only air as the oxidant gas.

Another aspect of the present invention is a method of modifying (i.e. retrofitting) an air-fired heater, comprising:

(A) providing a heater comprising:
   (i) a chamber having an outlet for combustion gases produced in said chamber,
   (ii) at least one fuel nozzle for feeding fuel into said chamber,
   (iii) means for feeding fuel to said fuel nozzle,
   (iv) means for providing air into said chamber for combustion with said fuel,
   (v) a conduit at least a portion of which is located within a region of said chamber so that its outer surface is heated by radiation of heat generated by said combustion of fuel within said chamber, said conduit having an inlet end outside said chamber for receiving fluid and an outlet end outside said chamber for discharging fluid outside said chamber, (B) minimizing the flow of air into said chamber other than air that accompanies the fuel and oxidant gas fed in step (H), (C) optionally replacing said fuel nozzle with another fuel nozzle for feeding fuel into said chamber, (D) providing proximal nozzle means for feeding oxidant gas proximal to said at least one fuel nozzle to stabilize the flame formed by combustion of the fuel as it emerges from said at least one fuel nozzle, (E) providing means for feeding oxidant gas to said proximal nozzle means, (F) providing a plurality of oxidant gas nozzles spaced further than said proximal nozzle means from said at least one fuel nozzle for supplying oxidant gas into said chamber, (G) providing means for feeding oxidant gas to said oxidant gas nozzles, (H) feeding fuel through said fuel nozzle into said chamber and feeding oxidant gas through said proximal nozzle means so as to stabilize the flame formed by combustion of the fuel as it emerges from said at least one fuel nozzle, while feeding oxidant gas into said chamber from said plurality of oxidant gas nozzles, and (I) combusting said fuel in said chamber with the oxidant gas fed through said proximal nozzle means and said oxidant gas nozzles, wherein the orientation of the axis of each oxidant gas nozzle with respect to the axis of the fuel nozzle, the aggregate cross-sectional area of said oxidant gas nozzles, and the velocity at which the oxidant gas fed through said oxidant gas nozzles, are effective to promote circulation within said chamber of combustion gases produced by combustion of said fuel with said oxidant gas and to provide that the ratio of the peak heat flux to the average heat flux to said conduit in said region during said combustion is lower than said ratio when the same fuel is combusted to obtain the same absorbed duty in the heater provided in step (A) prior to carrying out steps (B)–(G) but using only air as the oxidant gas.

Yet another aspect of the present invention is a heater comprising:

(A) a chamber having an outlet for combustion gases produced in said chamber, (B) at least one fuel nozzle for feeding fuel into said chamber and proximal nozzle means for feeding oxidant gas proximal to said at least one fuel nozzle to stabilize the flame formed by combustion of the fuel as it emerges from said at least one fuel nozzle, (C) means for feeding fuel to said at least one fuel nozzle, (D) means for feeding oxidant gas to said proximal nozzle means, (E) a conduit at least a portion of which is located within a region of said chamber so that its outer surface is heated by radiation of heat generated by combustion of said fuel within said chamber, said conduit having an inlet end outside said chamber for receiving fluid and an outlet end outside said chamber for discharging fluid outside said chamber, (F) a plurality of oxidant gas nozzles spaced further than said proximal nozzle means from said at least one fuel nozzle for supplying oxidant gas into said chamber, and (G) means for feeding oxidant gas from a source thereof to said oxidant gas nozzles, wherein the orientation of the axis of each oxidant gas nozzle with respect to the axis of the at least one fuel nozzle, and the aggregate cross-sectional area of said oxidant gas nozzles, are effective when sufficient oxidant gas is fed through said oxidant gas nozzles and said proximal nozzle means to combust with all of the fuel fed through said at least one fuel nozzle to promote circulation within said chamber of combustion gases produced by combustion of said fuel with said oxidant gas and to provide that the ratio of the peak heat flux to the average heat flux to said conduit in said region during said combustion is lower than said ratio when the same fuel is combusted to obtain the same absorbed duty in said heater but using only air as the oxidant gas.

Among the advantages that can be realized in the practice of the present invention are reduced fuel consumption for a given amount of heat transfer to the process fluid; increased heat absorption by the process fluid; increased throughput of the process fluid; lessening of the amounts of NOx formed; and uniformity of heat transfer and a reduction in the highest tube metal temperature attained (but without loss of overall heat transfer capability), thereby affording lessened heat-induced stress to the conduit and the heater.

The invention is particularly useful in that existing process heaters that are heated with air-fired burners can be retrofitted by installing or modifying one or more burners as described herein, and operating the process heater under the conditions of oxidant usage and fuel and oxidant feed conditions as described herein.

As used herein, "fuel" means hydrogen, carbon monoxide, or a liquid or gaseous hydrocarbon-containing composition of matter capable of being combusted with oxygen to generate heat. Preferred examples of fuel include natural gas and fuel gas streams produced within the facility in which the process heater is located.

As used herein, "oxidant gas" means a gas having an $O_2$ content of 23 vol.% to 100 vol.%. Preferably the oxidant gas contains at least 80 vol.% $O_2$ and more preferably at least 90 vol.% $O_2$.

As used herein, "oxy-fuel burner" means a burner that combusts fuel with oxidant gas.

As used herein, "radiant section" means a region of a process heater in which heat transfer to the process fluid is predominantly by radiation.

As used herein, "convective section" means a region of the process heater in which heat transfer is predominantly by convection.

As used herein, "transition section" means a region of a process heater which is located between a radiant section and a convective section.

As used herein, "heat flux" means heat transferred per unit area of heat transfer surface per unit time.

As used herein, "average heat flux" means the heat flux averaged over the total heat transfer surface area (i.e. tube surface area) within the section of the heater (i.e. the radiant section) in which the average heat flux is determined.

As used herein, "ratio of peak heat flux to average heat flux" means the peak heat flux measured on the tubes in a section (i.e. radiant section) divided by the average heat flux to the same tubes.

As used herein, "adiabatic flame temperature" means the maximum flame temperature reached by the combustion of the fuel and oxidant in the absence of any heat transfer away from the flame. It is a result of the compositions, proportions, and initial temperatures of the fuel and oxidant which are combusted.

As used herein, "average flame temperature" means the actual average temperature of the flame over its length. It is a result of the compositions, proportions, and initial temperatures of the fuel and oxidant which are combusted, as well as the amounts of furnace gases entrained into the flame and the heat transferred away from the flame during combustion.

As used herein, "stabilize" means to create a condition in which the flame begins very near the point where fuel and oxidant first mix, and such a flame has no tendency to lift off from that point, blow off from that point, or go out as long as steady flows of fuel and oxidant are maintained.

As used herein, "firing rate" means the amount of heat provided to the furnace per unit time as determined by the combustion heating value and flow rate of the fuel.

As used herein, "fired duty" means the firing rate.

As used herein, "absorbed duty means the amount of heat absorbed by the process fluid per unit time in that section of the heater, as determined by the process fluid flow rate, inlet and outlet temperatures, specific heat, and latent heat of vaporization if vaporization of the process fluid is taking place.

DETAILED DESCRIPTION OF THE INVENTION

The present invention is useful to achieve heat transfer to process fluids. Often, the heat transfer is intended simply to raise the temperature of the process fluid. The invention is also useful when the heat transfer is intended to achieve a partial or complete phase change of the process fluid, to achieve a change of state (such as dissolution), or to promote a chemical reaction, either a reaction between two or more constituents of the process fluid or the heat-mediated conversion of a single reactant. Examples of heat-mediated reactions include endothermic reactions, such as steam-methane reforming. Suitable process fluids include liquids, gases, liquid-gas mixtures, and liquid-solid mixtures.

Figure 1:
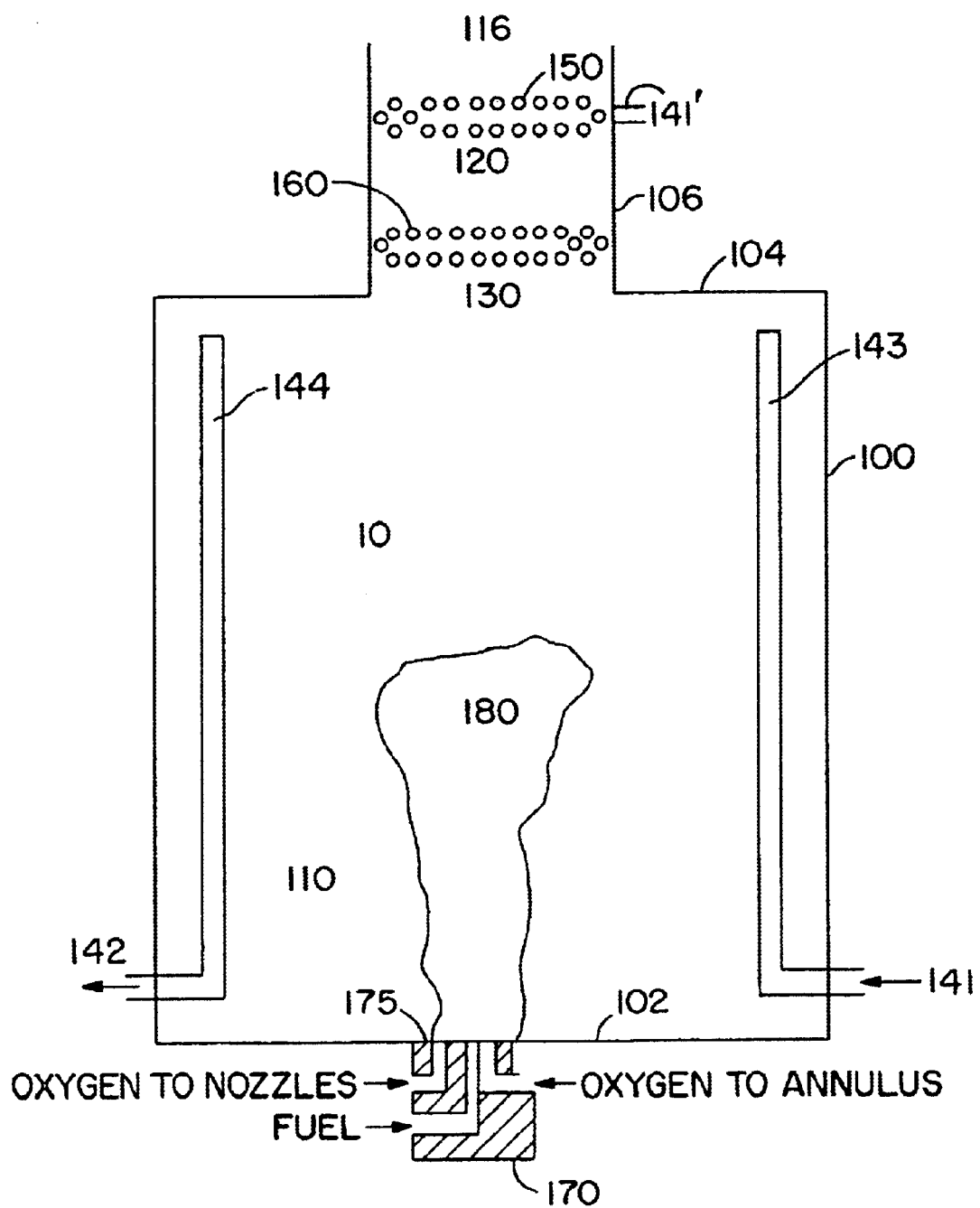
FIG. 1 is a cross-sectional view of a representative process heater embodying the present invention.

Referring to FIG. 1, a typical heater includes chamber 10 that is defined in this embodiment by wall 100, floor 102, ceiling 104, and convective section 106. Chamber 10 is considered to include all areas within the heater through the last region, here shown as 120 (described below), in which heat transfer to the process fluid can occur. Outlet 116 permits combustion gases to leave from chamber 10.

A conduit receives the process fluid from inlet 141 located outside the chamber 10, extends into chamber 10, conveys process fluid continuously within chamber 10, and terminates in outlet 142 which is also located outside the chamber 10. Inlet 141 can receive process fluid from an upstream processing apparatus or stage, or from a suitable feed source. Outlet 142 is typically connected to a receiving vessel or to another piece of process apparatus such as the inlet of a distillation column or the like.

Appropriate structures and materials of construction for the process heater are well known in the chemical process equipment field and can be determined from a number of sources available and familiar to those who practice in that field. One such source is "Fired Heaters for General Refinery Service", API Standard 560, Third Edition (American Petroleum Institute, May 2001). Similarly, suitable materials to use for the conduit are familiar to those in the chemical process equipment field.

The conduit carries the process fluid within the heater so that the heat generated by combustion of fuel within chamber 10 can be transferred to the process fluid through the walls of the conduit. While any path within chamber 10 can afford heat transfer, it is generally preferred to enhance the heat transfer to the process fluid by elongating the path and by locating the conduit in regions of chamber 10 in which heat transfer can occur by radiant transfer, by convective transfer, or by both radiant and convective heat transfer. It should be noted that the present invention is useful also in process heaters wherein one (or even more than one) process fluid is heated in the radiant section and a separate conduit (or more than one conduit) carries process fluid to be heated in the convective section of the same process heater.

Referring again to FIG. 1, the path of the conduit can preferably take the form of an undulating series of vertical sections, two of which are shown in FIG. 1 as 143 and 144, wherein adjacent vertical sections are serially connected so that the process fluid flows up one section, down the next, up the next, and so forth. The region of chamber 10 in which the conduit is arranged in this way is denoted as 110; it is termed the radiant section of the heater because the major portion of the heat transfer that occurs in this section occurs through radiation of heat to the conduit from the flame 180, the hot gases, and the hot interior walls of the section 110.

Many other arrangements of the conduit within the heater to promote heat transfer are possible and familiar to those practicing in this field. One example is a helical pattern of coils surrounding the flame 180. Published sources such as "Fired heaters for General Refinery Service, API Standard 560, Third Edition (American Petroleum Institute, May 2001) show simplified schematics of such conduit arrangements.

It is also preferred to arrange the conduit so that it forms an array that is a closely spaced series of passes or loops located in a portion of the chamber 10 through which pass gases that have been heated by the combustion, including gases formed by the combustion and ambient air that has been heated by the combustion. In FIG. 1, two such portions are shown: transition section 130, in which heat transfer occurs by convective and radiative transfer to array 160, and convective section 120, containing array 150, in which heat transfer occurs by convection.

It is also preferred that the conduit is spaced from the interior surfaces that define chamber 10, so that heated gases have access to a higher portion of the surface of the conduit, and so that the conduit can be heated by radiation of heat from the walls of the chamber 10, all of which enhances the opportunity for heat transfer to the process fluid.

FIG. 1 is intended to depict an embodiment in which the process fluid enters at 141', flows through arrays 150 and 160 and through sections such as 143 and 144, and exits at 142. It should be borne in mind that the advantages of the present invention can also be realized in embodiments in which more than one conduit enters the heater, heat is transferred into fluid contained in each conduit, and each conduit exits the heater. For instance, the radiant section 110 could be heating one process fluid in one conduit while the transition and convective sections 130 and 120 heat a fluid (of the same or different composition) in another conduit.

The embodiment shown in FIG. 1 is applicable to a variety of geometries, such as cylindrical, box, cabin, and others known in this field, so long as they afford some opportunity for heat transfer from the burner flame to the conduit. Published sources such as "Fired Heaters for General Refinery Service", API Standard 560, Third Edition (American Petroleum Institute, May 2001) show simplified schematics of such geometries.

It is preferred that the chamber 10 is sealed as much as possible to minimize infiltration of air from the atmosphere outside chamber 10. Doing so enhances the ability to lessen the formation of NOx, and reduces fuel consumption for a given amount of heat transfer.

Figure 2:
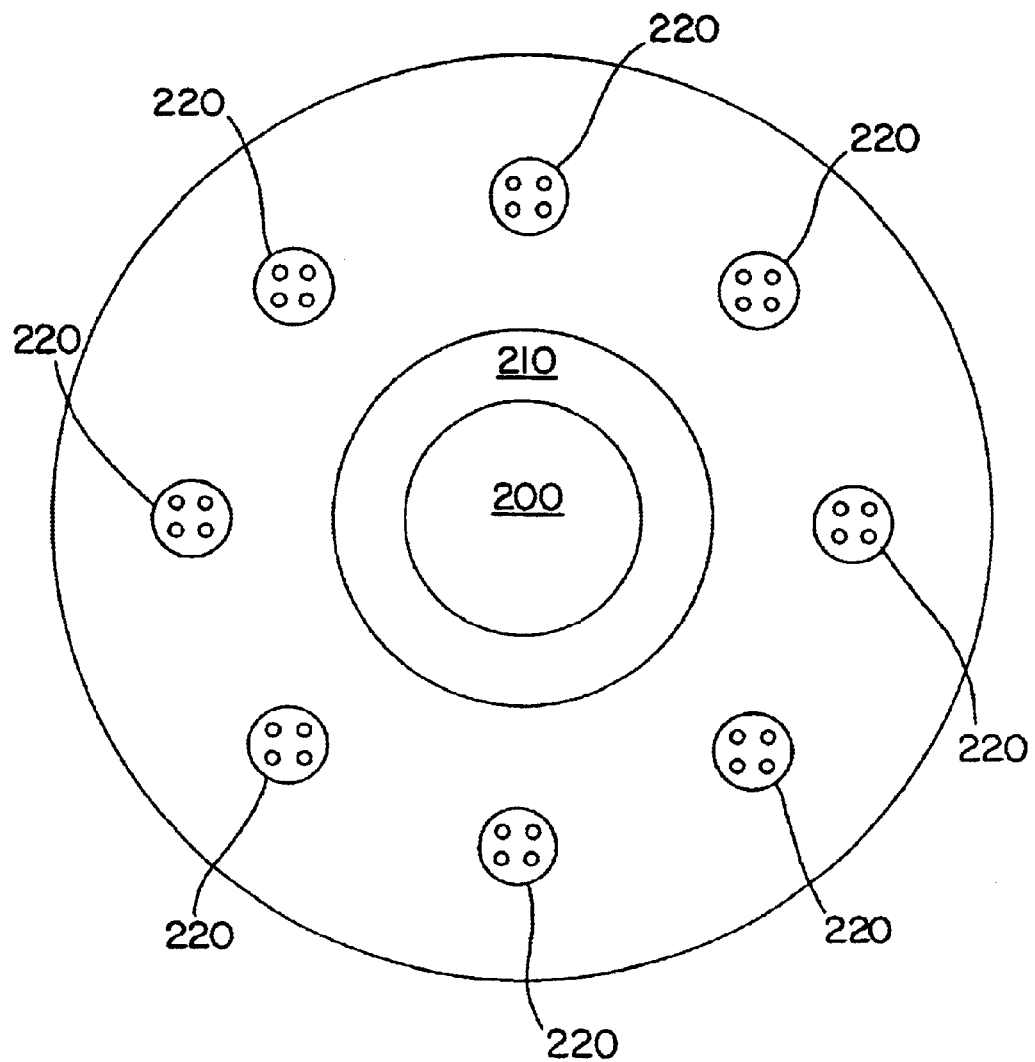
FIG. 2 is view from above of the front of a representative burner useful in the present invention.

The heater also includes burner 170 which is shown in cross-section in FIG. 1 and in a top view in FIG. 2. Referring to FIG. 2, fuel nozzle 200 is surrounded by annular feed passage 210 which is a preferred embodiment of proximal nozzle means by which oxidant gas is fed into the chamber 110 to stabilize the flame at the face of the burner. One mode of attaining that stabilization is to feed oxidant gas through an annular passage 210 so as to envelop at least a portion of the fuel as the fuel emerges from nozzle 200 (other useful modes are described in the next paragraph). Fuel is fed to nozzle 200 by conventional means (not depicted) including a source such as a tank or a feed line, which by itself or with the aid of a pump or other injector provides the fuel to nozzle 200 through an associated feed line under sufficient pressure that the fuel emerges from nozzle 200 into chamber 10. Oxidant gas is fed to feed passage 210 by conventional means (not depicted) including a source such as a tank or a feed line, which by itself or with the aid of a pump or other injector provides the oxidant gas to passage 210 through an associated feed line under sufficient pressure that the oxidant gas emerges from passage 210 into chamber 10.

Other modes of enhancing stabilization of the flame can be used. For instance, the annular passage 210 can be replaced by a plurality of separate orifices arranged around fuel nozzle 200. In another alternative embodiment, nozzle 200 can be connected to a source of oxidant gas so that oxidant gas is injected into the chamber 10 from nozzle 200, in which case feed passage 210 (or the alternative thereto comprising a plurality of separate orifices) is connected to a source of fuel and the fuel is injected into chamber 10 therefrom.

Also present in the top surface 175 of burner 170 are two or more oxidant gas nozzles 220. The nozzles 220 are spaced apart from fuel nozzle 200, as described further below. While it is often convenient to provide the nozzles 220 as part of a unitary burner such as is shown in FIG. 1, the oxidant nozzles 220 can also be provided as a series of openings in the floor of the chamber 10, appropriately dimensioned and oriented as described herein. Oxidant gas is fed to the oxidant gas nozzles by conventional means (not depicted) including a source such as a tank or a feed line, which by itself or with the aid of a pump or other injector provides the oxidant gas to the nozzles 220 through an associated feed line under sufficient pressure that the oxidant gas emerges from the nozzles 220 into chamber 10.

Sufficient oxidant gas is fed through burner 170 to provide enough $O_2$ to combust the fuel in a flame within chamber 10. An amount of $O_2$ which needs to be sufficient to maintain a stable flame, is provided through the first oxidant gas feed passage, which is passage 200 or passage 210 as the case may be. The remaining portion of the oxidant gas is fed through oxidant gas nozzles 220. This remaining portion provides an important function in enabling staged combustion, recirculation and aspiration of combustion gases within chamber 10.

A preferred embodiment permitting achievement of this function is described in U.S. Pat. No. 4,541,796, the entire content of which is hereby incorporated herein by reference. In pertinent part, the velocity of the oxidant gas as it is injected from the oxidant gas nozzles 220 is preferably provided by the formula $V \geq 5.7 P - 70$ where V is the velocity in feet per second and P is the $O_2$ content of the oxidant gas in volume percent. The preferred arrangement of the oxidant gas nozzles 220 relative to the fuel nozzle 200 is provided by the formula $X \geq 4D$ where the oxidant gas nozzle has a diameter D at the point from which the oxidant gas emerges into chamber 10, and X is the distance from the outer edge of the oxidant gas nozzle to the outer edge of the fuel nozzle. Preferably, X is at least 8 times D.

It is also preferred that said diameter D is provided by the formula $$D \leq (40/(P-8)) \cdot (F/N)^{1/2}$$

where D is in inches, P is the $O_2$ content of the oxidant gas in volume percent, F is the burner firing rate in million Btu per hour (MMBtu/h) and N is the number of oxidant gas nozzles.

Various arrangements of the fuel nozzle 200 and the oxidant gas nozzles 220 can be employed. There may be only one fuel nozzle surrounded by a plurality of oxidant gas nozzles, there may be only one oxidant gas nozzle surrounded by a plurality of fuel nozzles, there may be one oxidant gas nozzle and one fuel nozzle, or there may be a plurality of both. Preferably there is one fuel nozzle 200 located centrally in chamber 10, surrounded by a plurality (more preferably 6 to 8) of oxidant nozzles 220 which are arrayed in a circular pattern around fuel nozzle 200.

The oxidant gas must be injected through the oxidant gas nozzles 220 at a velocity sufficient to create an aspirating effect around and in the vicinity of each oxidant gas nozzle 220 so that furnace gases, consisting principally of combustion products, can be aspirated directly from the vicinity of the oxidant gas being injected from the nozzles 220 into that oxidant gas. Typically, the oxidant gas velocity should be 150 feet per second to 10,000 feet per second. A preferred satisfactory velocity is 400 to 2500 fps at the maximum firing rate of the burner.

Given the amount $O_2$ that is necessary to combust a given amount of fuel being fed, there will be a variety of combinations of the number of nozzles and their sizes which will be able to provide a satisfactory mass flow rate of $O_2$. Then the nozzle size(s), and the pressure to be applied to the oxidant gas flows, can be determined, given also that higher velocity of the oxidant gas streams promotes better mixing and circulation of the gases in the chamber.

Referring to FIG. 2, oxidant gas nozzles 220 are evenly spaced on a circle around fuel nozzle 200, at the aforementioned distance X between the outer edge of the fuel nozzle and the closest edge of the closest of the oxidant gas nozzles 220. As noted, though, other arrangements and numbers of nozzles are effective too, so long as the dimensional requirement embodied in the relationship between X and D is maintained, thereby enabling aspiration of sufficient furnace gas into the oxidant gas stream emerging from nozzles 220 before the oxidant gas mixes with the fuel.

Annular feed passage 210 or equivalent constructions provides oxidant gas which envelops at least a portion of the fuel and provides flame stabilizing. In FIG. 2, this flame stabilizing means constitutes annular feed passage 210, although as noted other arrangements work as well such as a circular array of separate nozzles performing the function of passage 210. In the preferred embodiment, oxidant gas is fed through passage 210, but only in an amount sufficient to create an oxidant gas envelope around all, or at least a portion, of the fuel jet injected through nozzle 200. The amount of oxidant gas fed through passage 210 is small relative to the amount of oxidant gas fed through nozzles 220, and typically comprises 5 to 10% of the total amount of $O_2$ fed through burner 170.

In addition to the velocity of the oxidant gas, furnace geometry also has an impact on the effectiveness achieved by this type of burner in providing the benefits of this invention. A confined coaxial jet in a cylindrical enclosure naturally tends to produce a recirculation flow pattern that extends between 2 and 3 cylinder diameters from the jet source. At axial distances beyond about 3 diameters, the flow pattern becomes essentially plug flow or uniform pipe flow in nature. At axial distances less than about 2 diameters, the jet will tend to persist through the exit plane or impinge on the far wall. In more complex geometries with more than one burner present, one may consider the concept of a unit cell defining the flow domain of each burner, and a suitable recirculating flow pattern will be created in each unit cell if its aspect ratio is between 2 and 3. In cases where the unit cell is not cylindrical, the aspect ratio can be defined as the ratio of the radiant section height divided by the width of the cell in which the burner is centered. As an example, a rectangular furnace volume 30 feet tall, 10 feet wide, and 50 feet long could be divided into 5 cells each 10 ft by 10 ft by 30 ft tall. Each of these cells would have an aspect ratio of 3 for a single burner placed in the center of each 10 ft by 10 ft square thus defined. In practice, the aspect ratio of the cell occupied by each burner or tightly grouped cluster of burners should be between 1 and approximately 5. Ideally this aspect ratio is between about 2.5 and 3. However, a wider range of aspect ratios presented by other process heater geometries, ranging from less than 1 to more than 10, can be accommodated by appropriate adjustment of the angle of the oxidant gas nozzle orientation, and by the number of such nozzles and the oxidant gas velocity.

To enhance mixing and flow uniformity, the number of oxidant gas nozzles 220 employed with a burner 170 should be greater than 1, is preferably 6 or more, but in practice may be 150 or more. It is usually desirable for these nozzles to be placed symmetrically about the face of the burner, as seen in FIG. 2.

Some or all of the oxidant gas nozzles 220 preferably define an angle of divergence with respect to the axis of the burner, which is generally aligned with the axis of its unit cell (or the axis of the furnace in the event it defines a single unit cell). At one extreme, the nozzles 220 may be substantially aligned with the burner axis, defining a 0-degree angle of divergence. At the other extreme, the nozzles may be substantially perpendicular to the burner axis, defining a 90 degree angle of divergence. Although in some instances one or the other of these limits may be desirable, the preferred divergence angle for the most uniform temperature profile is generally greater than zero degrees up to about 35 degrees from the fuel nozzle axis for a cylindrical furnace with an aspect ratio of 3. It should be appreciated that the desired conditions may be obtained by angling some but not all of the nozzles 220, or by providing differing angles of orientation for different ones of the nozzles 220.

Some or all of the oxidant gas nozzles may define an angle of convergence toward the axis of the burner. Operation with nozzles in converging orientation helps to shorten the flame, while still attaining entrainment of significant amounts of furnace gas before the gas enters the flame. Oxidant gas nozzles in a converging orientation should be located away from the fuel nozzle, to permit the oxidant gas streams to intersect with the flame above the fuel nozzle, and should define a relatively shallow angle (e.g. up to about 35 degrees) with respect to the burner axis.

It has been determined that providing a plurality of the oxidant gas nozzles 220, orienting the axes of the nozzles 220 at an angle with respect to the axis of the fuel nozzle(s) so as to enable recirculation of combustion gases, and sizing the crosssectional areas of the nozzles (or for circular nozzles, their diameters) to enable desired velocity and mass flow of oxidant gas therethrough, when combined with the use of oxidant gas having $O_2$ content above that of air and preferably of 80 vol.% or higher, one can achieve a more uniform temperature from top to bottom within the radiant section. Lowering the ratio of the peak heat flux to the average heat flux as is achieved by operation in accordance with this invention indicates attainment of greater uniformity of heat flux, as well as the ability to provide a greater amount of total heat transfer for a given maximum tube surface temperature. This enables the operator to adjust the fuel and oxidant firing rates so as to keep the temperature at the conduit outer surface from exceeding temperature limits imposed by the conduit material or by the nature of the process fluid (for instance, to avoid coking or other undesired side reaction that might be caused by excessive temperature), and then reap a higher overall average heat flux to the process fluid because of the more uniform temperature profile throughout the radiant section.

Attainment of the desired increased average heat flux at the conduit surfaces can be ascertained and monitored effectively by achieving a greater absorbed duty at a given firing rate relative to the air-fired case, while monitoring tube surface temperatures to ascertain that the peak temperatures are lower than those of the air-fired case. The average heat flux may be determined by dividing the absorbed duty (i.e. total heat absorbed by the process fluid as it passes through that section of the heater) by the area of heat transfer surface (tube outer surface area) through which it passed. The average heat flux may also be determined by averaging measurements or calculated values of heat flux at points distributed within the heater. The heat flux at a point on a surface within the heater may be obtained by performing a heat balance on that surface, given a known rate of removal of heat. Various devices and techniques to accomplish this measurement are available to those knowledgeable in this field.

The thermal efficiency of a given furnace is generally linked directly to its exhaust temperature or stack temperature. This is because the primarily sensible heat loss from most furnaces is heat lost with the combustion products exhausting to the atmosphere. With oxy-fuel combustion instead of air-fuel combustion, the volume of exhaust gases is greatly reduced, and therefore the stack heat loss is reduced and the fuel efficiency is increased. The amount of fuel savings achievable with oxy-fuel is related to the baseline stack temperature when operated conventionally with air, and heaters with the highest stack temperatures when operated conventionally with air will exhibit the greatest fuel savings when converted to oxy-fuel. Conversely, heaters with relatively low stack temperatures will see little fuel savings when converted to oxy-fuel. These heaters are already quite efficient and there is little stack heat loss to be eliminated in the conversion. This situation is typical of most boilers. As a consequence, one may state that the fuel savings benefits of conversion to oxy-fuel are greater on those heaters with higher stack temperatures. However, the other benefits of this technology may make it desirable to apply even to heaters with relatively low stack temperatures.

In order to capture the technical benefits of an oxy-fuel burner in a fired heater, one must minimize the entry of air into chamber 10, and preferably should substantially exclude air from entering the furnace. Air infiltration through gaps, view ports, or even the air burners themselves can increase the total mass flow of combustion gases through the heater. This will create a heat load on the heater and mitigate the fuel efficiency gains associated with oxy-fuel combustion. Air infiltration will also generally lower the tube temperatures at the bottom of the furnace and will tend to raise temperatures at the top of the furnace. This negatively impacts the desired heat flux uniformity, and can translate into reduced peak throughput. Air infiltration also introduces nitrogen into the furnace atmosphere, which can have a detrimental impact on NOx performance. In an air-fired furnace, nitrogen concentration tends to be more than 70% by volume and is quite insensitive to the air flow rate. However, with oxy-fuel combustion and a well-sealed furnace, nitrogen concentrations can be reduced to less than 5%. Since NOx formation is a function of nitrogen concentration, among other things, reduced nitrogen levels favor lower NOx emissions. Therefore, to the extent possible, the more air which can be excluded from the furnace, the lower the NOx emissions will be when using this technology. If air infiltration is such that nitrogen concentrations are greater than about 50%, the benefits of this process will be greatly diminished.

NOx formation is further lessened by means of oxygen staging and aspiration of large amounts of in-furnace (recirculation) gases to reduce peak flame temperature. The resulting increased flame volume due to aspiration of recirculation gases and higher concentrations of $CO_2$ and $H_2O$ promotes efficient radiant heat transfer. Burner design with the ability to adjust the angle of the oxidant gas nozzle axis helps to provide a nearly uniform heat flux profile, and potentially increase absorbed duty (defined as the total amount of heat absorbed by the process fluid) by up to 40%. Radiant tubes in fired heaters also tend to see higher heat fluxes on the side directly facing the flares. Since these tubes are offset from the walls, a strong recirculating flow pattern in the radiant section enhances the convective heat transfer component in this region, thus enhancing effective utilization of heat transfer surface.

The reduction in combustion product flow into the convective section causes a drop in the amount of heat carried into that section. Although the temperature of the gases entering the convective section may be higher, the reduced volume and resulting lower convection coefficient tend to limit the potential for overheating of the tubes in the transition section. This allows the oxy-fuel burner, in contrast to the air burner, to make use of higher gas temperatures in the radiant section without causing overheating in the transition section. The result is a convection section that sees a much smaller flow of gases entering at a higher temperature and leaving at a lower temperature, relative to the air case. This translates into a lower stack temperature and a higher convective efficiency even though the total convective absorbed duty tends to be reduced.

Also, although the exhaust gas flow drops by about 75% which would suggest a similar drop in convective duty, the increased gas inlet temperature into the convective section and reduced stack temperature lead to a drop of only about 50% in the heat duty in the convective section. The convective duty in most fired process heaters is only 10% to 30% of the total absorbed duty (in the air case), so a 50% reduction in convective duty can be more than made up by the increase in radiant duty that is afforded by the present invention.

Thus, the present invention provides benefits that are realized in the radiant section but also frequently will provide benefits in the efficiency of the convective section as well. In many heaters, the convective section is used to preheat the feedstock before it enters the radiant section. However, in some heaters a different fluid is heated in the convective section, and in some cases low pressure steam is generated primarily to recover heat from the stack gases. Some process heaters with which this invention is useful contain only a radiant section. In that case reduced exhaust flow means reduced stack losses (fuel savings), and an increase in absorbed duty is more readily obtained.

The invention is further illustrated in the following example.

EXAMPLE 1

In this example, two oxy-fuel burners of the configuration illustrated in FIG. 2 were installed in a commercial refinery heater rated for 70 MMBtu/h (lower heating value basis) fired duty. The radiant section of this heater was approximately 18.5 feet in diameter and 46 feet tall and contained a circle of 8 low NOx air burners in the floor. Air was supplied to these burners through natural draft. The oxy-fuel burners were installed in the floor within the ring of air burners, diagonally opposite to each other in a circle approximately one foot from the center.

Initially, a total of 32 oxidant gas nozzles were employed, each 0.25 inch in diameter and each angled at 9 degrees to the axis of the fuel nozzle.

These were replaced with a variety of nozzles, as follows: 16 nozzles 0.25 inch in diameter, angled 9 degrees to the axis of the fuel nozzle; 12 nozzles 0.157 inch in diameter not angled with respect to the axis of the fuel nozzle (i.e. 0 degrees angle); 4 nozzles 0.157 inch in diameter, angled 30 degrees to the axis of the fuel nozzle; and 8 nozzles 0.216 inch in diameter, angled 30 degrees to the axis of the fuel nozzle.

The installation was carried out to allow conversion from air firing to oxygen firing on the fly without shutting down operation of the process heater. Initially the heater was operating on air burners. The oxy-fuel burners were ignited at a low firing rate and then their firing rates were increased as the firing rates of the air burners were decreased gradually to zero. During this process, the stack damper was progressively closed to reduce the amount of air drawn into the heater. Eventually fuel to the air burners was completely shut off and all firing was through the oxy-fuel burners. At this point, the damper was closed fully and the air inlets on the low NOx air burners were sealed off to minimize air infiltration. Whether operating on the air burners or oxy-fuel burners, the fuel input to the heater was controlled to maintain a setpoint outlet temperature to satisfy radiant section absorbed duty only (temperature of process fluid leaving the heater). Excess oxygen measured by an in-situ analyzer in the exhaust duct was controlled manually either by restricting air flow or by changing the oxygen flow rate. Additional analyzers were brought on site to monitor $O_2$, $CO_2$, CO, and NOx concentrations in the flue gas. Infrared thermometry of the visible tube surfaces using an infrared camera was also performed, allowing overall mapping of the tube surface temperatures. All available data from existing heater instrumentation was recorded on a 6 minute average basis for the duration of the test. Air flow rates into the heater were calculated for each data point via mass balance, as the oxygen flow and fuel flow and composition were known and excess oxygen at the stack was measured.

The test involved approximately 2 weeks of baseline operation on air, including a short duration test at an increased product flow rate through the radiant section. Testing with the oxy-fuel burners then commenced and the heater was gradually converted over to oxy-fuel firing and operated in this mode for 5 days. During operation on oxy-fuel, attempts were made to seal off as many sources of air ingress as possible. There were still some sources of air infiltration that were not completely sealed, primarily around the process fluid entrances and exits.

NOx emissions were reduced by about 50%, from approximately 2.2 lb/hr on air to about 1.1 lb/hr on oxygen. Per unit firing rate, the NOx emissions were reduced from about 0.036 lb/mmbtu to 0.024 lb/mmbtu. The difference between these measures occurs because the firing rate on oxygen was also reduced by about 24%. All these figures represent operation at the nominal throughput rate. At the increased throughput conditions, NOx emissions went up, but the 50% differential between oxygen and air remained. Fuel savings at the higher throughput was about 33% relative to air. The preceding figures are based upon equivalent radiant duty in this heater. The convective duty was reduced during oxygen operation by an amount about 50%, and overall absorbed duty dropped. This is a case of a process heater in which the convective duty is so high a portion of the total absorbed duty that the increase in the duty in the radiant section was less than the decrease in the convective section. However, even so, the overall heater efficiency, which accounts for all heat absorbed by both radiant and convective sections, improved from a range of 80 to 85% on air to 94 to 95% on oxygen.

This could be interpreted as a 10 to 15% fuel savings overall.

Tube temperature data indicates that the oxy-fuel burner had a significant impact on the heat flux profile and resulting temperature profiles. Initially the oxy-fuel burners were tested with oxygen nozzles whose axes diverged 9 degrees from the fuel feed nozzle axis, and the radiant section tube temperatures were honest at the top while the bottom of the heater remained relatively cold. Orienting the oxidant gas nozzles to have an effective angle of divergence of 12.4 degrees led to a reduction in the peak temperatures at the top and significantly raised the bottom temperatures. The resulting temperature profile still increased from the bottom up, with a maximum at the top, but the temperature difference observed along each tube was reduced relative to the air case, as was the peak temperature. Heat flux profiles calculated from refractory wall temperatures showed the same trend, with a significantly lower ratio of peak to average heat flux along the vertical direction when using oxy-fuel. These results demonstrate the ability of the invention to improve and ultimately optimize the heat flux profiles in this heater. These results indicate that this invention can provide more uniform heat flux profiles, which can be utilized to provide the same absorbed duty in the radiant section with lower peak tube temperatures or to provide greater absorbed duty in the radiant section while maintaining same peak tube temperature limit relative to the air-burner baseline.

What is claimed is:

1. A method of heating a fluid, comprising:
    (A) providing a heater comprising:
        (i) a chamber having an outlet for combustion gases produced in said chamber,
        (ii) at least one fuel nozzle for feeding fuel into said chamber, and proximal nozzle means for feeding oxidant gas proximal to said at least one fuel nozzle to stabilize the flame formed by combustion of the fuel as it emerges from said at least one fuel nozzle,
        (iii) means for feeding fuel to said at least one fuel nozzle,
        (iv) means for feeding oxidant gas to said proximal nozzle means, and
        (v) a conduit at least a portion of which is located within a region of said chamber so that its outer surface is heated by radiation of heat generated by combustion of said fuel within said chamber, said conduit having an inlet end outside said chamber for receiving fluid and an outlet end outside said chamber for discharging fluid outside said chamber,
    (B) feeding fuel through said at least one fuel nozzle into said chamber and feeding oxidant gas through said proximal nozzle means so as to stabilize the flame formed by combustion of the fuel as it emerges from said at least one fuel nozzle, while feeding oxidant gas into said chamber from a source thereof through a plurality of oxidant gas nozzles spaced further than said proximal nozzle means from said at least one fuel nozzle, and
    (C) combusting said fuel in said chamber with the oxidant gas fed through said proximal nozzle means and said oxidant gas nozzles, wherein the orientation of the axis of each oxidant gas nozzle with respect to the axis of the at least one fuel nozzle, the aggregate cross-sectional area of said oxidant gas nozzles, and the velocity of the oxidant gas fed through said oxidant gas nozzles, are effective to promote circulation within said chamber of combustion gases produced by combustion of said fuel with said oxidant gas and to provide that the ratio of the peak heat flux to the average heat flux to said conduit in said region during said combustion is lower than said ratio when the same fuel is combusted to obtain the same absorbed duty in the heater provided in step (A) but using only air as the oxidant gas.

2. A method according to claim 1 wherein entry of air into said chamber other than through said outlet is minimized.

3. A method according to claim 1 wherein there are a plurality of said oxidant gas nozzles arrayed around said fuel nozzle.

4. A method according to claim 1 wherein at least part of the portion of said conduit that is within said chamber is spaced inwardly from the inner surface of said chamber.

5. A method according to claim 1 wherein said chamber has a section wherein heat transfer to said conduit is predominantly radiant and a section wherein heat transfer to said conduit is predominantly convective.

6. A method according to claim 1 wherein the $O_2$ content of said oxidant gas is at least 80 vol.%.

7. A method according to claim 1 wherein the $O_2$ content of said oxidant gas is at least 90 vol.%.

8. A method according to claim 1 wherein said fuel comprises natural gas.

9. A method according to claim 1 wherein said oxidant gas is fed through said oxidant gas nozzles at a velocity of 150 to 10,000 feet per second.

10. A method according to claim 1 wherein said oxidant gas is fed through said oxidant gas nozzles at a velocity of 400 to 2500 feet per second.

11. A method of modifying an air-fired heater, comprising:
    (A) providing a heater comprising:
        (i) a chamber having an outlet for combustion gases produced in said chamber,
        (ii) at least one fuel nozzle for feeding fuel into said chamber,
        (iii) means for feeding fuel to said fuel nozzle,
        (iv) means for providing air into said chamber for combustion with said fuel,
        (v) a conduit at least a portion of which is located within a region of said chamber so that its outer surface is heated by radiation of heat generated by said combustion of fuel within said chamber, said conduit having an inlet end outside said chamber for receiving fluid and an outlet end outside said chamber for discharging fluid outside said chamber,
    (B) minimizing the flow of air into said chamber other than air that accompanies the fuel and oxidant gas fed in step (H),
    (C) optionally replacing said fuel nozzle with another fuel nozzle for feeding fuel into said chamber,
    (D) providing proximal nozzle means for feeding oxidant gas proximal to said at least one fuel nozzle to stabilize the flame formed by combustion of the fuel as it emerges from said at least one fuel nozzle, (E) providing means for feeding oxidant gas to said proximal nozzle means, (F) providing a plurality of oxidant gas nozzles spaced further than said proximal nozzle means from said at least one fuel nozzle for supplying oxidant gas into said chamber, (G) providing means for feeding oxidant gas to said oxidant gas nozzles, (H) feeding fuel through said fuel nozzle into said chamber and feeding oxidant gas through said proximal nozzle means so as to stabilize the flame formed by combustion of the fuel as it emerges from said at least one fuel nozzle, while feeding oxidant gas into said chamber from said plurality of oxidant gas nozzles, and (I) combusting said fuel in said chamber with the oxidant gas fed through said proximal nozzle means and said oxidant gas nozzles, wherein the orientation of the axis of each oxidant gas nozzle with respect to the axis of the fuel nozzle, the aggregate crosssectional area of said oxidant gas nozzles, and the velocity at which the oxidant gas fed through said oxidant gas nozzles, are effective to promote circulation within said chamber of combustion gases produced by combustion of said fuel with said oxidant gas and to provide that the ratio of the peak heat flux to the average heat flux to said conduit in said region during said combustion is lower than said ratio when the same fuel is combusted to obtain the same absorbed duty in the heater provided in step (A) prior to carrying out steps (B)–(G) but using only air as the oxidant gas.

12. A method according to claim 11 wherein steps (C) and (D), or steps (C), (D) and (F) are carried out by providing a unitary burner that comprises said fuel nozzle and said proximal nozzle means and, optionally, said plurality of oxidant gas nozzles.

13. A method according to claim 11 wherein there are a plurality of said oxidant gas nozzles arrayed around said fuel nozzle.

14. A method according to claim 11 wherein at least part of the portion of said conduit that is within said chamber is spaced inwardly from the inner surface of said chamber.

15. A method according to claim 11 wherein said chamber has a section wherein heat transfer to said conduit is predominantly radiant and a section wherein heat transfer to said conduit is predominantly convective.

16. A method according to claim 11 wherein the $O_2$ content of said oxidant gas is at least 80 vol.%.

17. A method according to claim 11 wherein the $O_2$ content of said oxidant gas is at least 90 vol.%.

18. A method according to claim 11 wherein said fuel comprises natural gas.

19. A method according to claim 11 wherein said oxidant gas is fed through said oxidant gas nozzles at a velocity of 150 to 10,000 feet per second.

20. A method according to claim 11 wherein said oxidant gas is fed through said oxidant gas nozzles at a velocity of 400 to 2500 feet per second.

* * * * *